Figure 1:
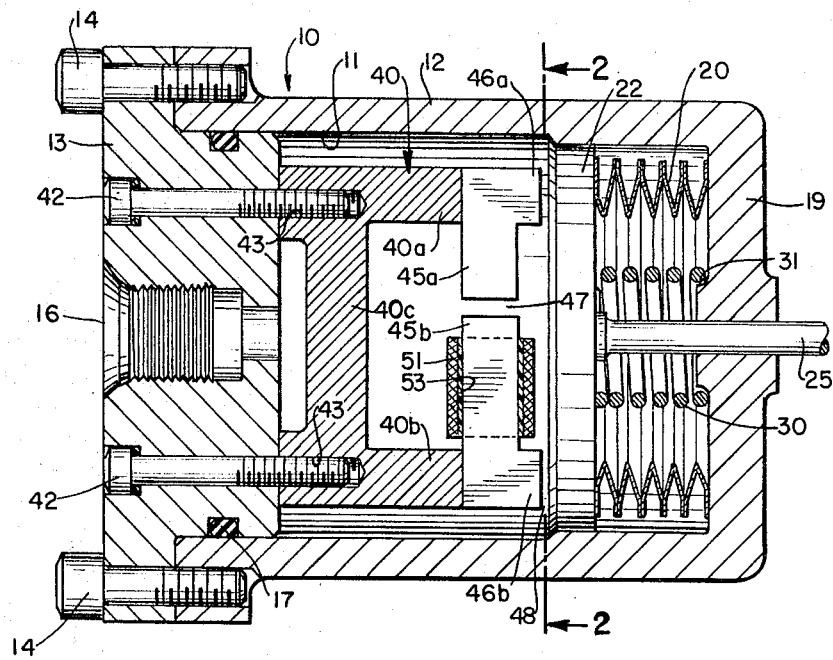

Jan. 31, 1967  R. S. GRIFFING  3,301,141
MAGNETICALLY DAMPED PNEUMATIC CONTROL DEVICES
Filed Oct. 20, 1964

INVENTOR.
ROBERT S. GRIFFING
BY Darby & Darby
ATTORNEYS

United States Patent Office 3,301,141
Patented Jan. 31, 1967

3,301,141
MAGNETICALLY DAMPED PNEUMATIC
CONTROL DEVICES
Robert S. Griffing, Los Angeles, Calif., assignor to Fairchild Hiller Corporation, a corporation of Maryland
Filed Oct. 20, 1964, Ser. No. 405,097
8 Claims. (Cl. 92—143)

This invention relates to pneumatic control devices and more particularly to pneumatic control devices which are damped by a passive magnetic damping circuit.

When using pneumatic control devices, such as pneumatic sensors, it is usually necessary to provide some form of damping. In general, the damping force supplied the moving element of a pneumatic control device is opposite to the direction of its motion and is desirably proportional to its speed. The damping force is conventionally used to control the response of the control device, prevent it from oscillating and stabilizing it against vibration.

Several types of damping have heretofore been used with pneumatic control devices. One is the so-called coulomb friction type of damping in which two or more of the parts of the control devices are allowed to rub together. This develops a friction force opposing the motion of the control device but the damping so provided by the friction is independent of the speed of response of the device. While this type of damping is sufficient for some types of pneumatic control devices, it is not adequate for pneumatic sensors whose accuracy would be seriously degraded by the friction between the parts of the sensor which must be overcome. This is particularly true for small movements of the sensor.

Another type of damping used is a dashpot which is, for example, a piston attached to a movable element of the control device. The piston pumps fluid through a restriction in proportion to the motion of the control device and this impedes the sensor motion to provide damping. In some cases damping by a dashpot is not desirable since it necessitates the addition of a mass to the control device and results in non-linear damping. This is, of course, particularly undesirable in a pneumatic sensor where a low moving mass is desired to maximize speed and accuracy of response to changes in the pneumatic fluid being monitored.

Another type of damping arrangement utilizes mechanical hysteresis. Here, the members which provide elastic restraint to the pneumatic control device, such as a spring, or a bellows, are intentionally provided with mechanical hysteresis to damp the operation of the unit. This means that some of the force normally used to produce motion of the control device's movable element is utilized to overcome the mechanical hysteresis. Therefore, the control device is damped since all of the force is not translated into motion. Mechanical hysteresis is somewhat like coulomb friction except that the threshold effect of overcoming the elastic restraint is more pronounced in the latter. This type of damping also tends to degrade accuracy since its effect is arbitrary for zero speed of the moving element.

The present invention relates to a damping arrangement for pneumatic control devices, such as pneumatic sensors, which utilizes a wholly passive component in a magnetic circuit. In accordance with the invention, a magnetic damping arrangement is provided in which the movable element of the control device has a head of ferro-magnetic material. Damping is accomplished by a permanent magnet affixed in spaced relationship to the head which provides an attractive force in a direction opposite to the direction of motion of the movable element under pressure. The magnet has a pair of pole pieces which establish a shunt flux gap for the magnet and a variable gap between the pole pieces and the head of the movable element. As the gap between the pole pieces and the head changes, which is brought about by a change in the input pressure, flux is diverted from the shunt gap to the variable gap in proportion to the spacing between the pole pieces and the head. The magnet also has a shorting coil which impedes the transfer of flux in proportion to the speed of the head. This provides the relatively simple magnetic damping arrangement with the capability of damping the control device in a manner related to both the magnitude and speed of the movable element. Also, the damping arrangement does not add any mass to the moving element of the sensor and no inaccuracies are introduced as would be the case with rubbing friction.

It is therefore an object of the present invention to provide a pneumatic control device having a passive magnetic damper.

A further object is to provide a pneumatic control device in which damping is provided by a permanent magnet which reacts with the movable element of the control device.

Another object is to provide a pneumatic sensor having a movable head which reacts with a permanent magnet having a fixed shunt gap and a variable gap to provide damping proportional to both the displacement and speed of movement of the head.

It is a further object to provide a pressure magnetic damping arrangement for a pneumatic control device which adds no mass to the moving element of the device.

Figure 2:
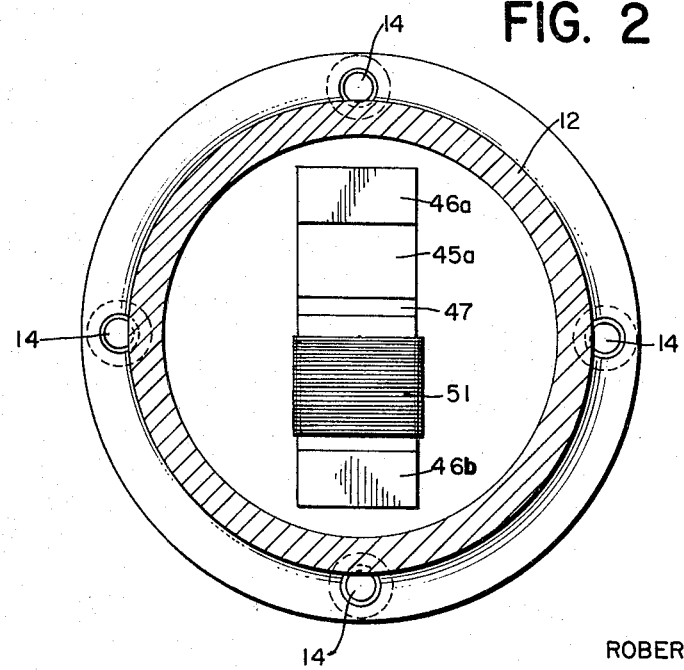

Other objects and advantages of the present invention will become more apparent upon reference to the following specification and annexed drawings in which:

FIGURE 1 is an elevational view taken partly in section of a pneumatic sensor with magnetic damping; and FIGURE 2 is an end view, taken in section, along lines 2—2 of FIGURE 1.

In FIGURE 1 a pneumatic sensor 10 has an outer housing 12 with an end wall 13 secured thereto by a number of screws 14. The housing has an interior bore 11 which is to be isolated from the ambient environment so an O-ring 17 or other suitable type of seal is also preferably used between end wall 13 and the housing. A screw threaded inlet 16 is provided through the end wall 13 to accommodate the fluid flow, either liquid or gas, into the housing.

The other end wall 19 of the housing has one end of a pressure responsive bellows 20 secured thereto. Any other suitable type of pressure responsive device may be used, such as a diaphragm, bourdon tube, etc. The other end of the bellows is secured to one face of a piston 22, hereafter called the sensor head, which is free to ride within the housing interior bore between end wall 19 and the pole pieces of a magnet 40. The sensor head is made of a suitable magnetically responsive material, such as steel for example, which reacts with magnetic flux and is strongly attracted thereby. A rod 25 is connected to the sensor head within the bellows and extends through an opening in end wall 19 for actuating another device, such as a switch, regulator, etc.

A reference spring 30 is located within the bellows 20 in contact with the interior face of end wall 19 and the face of the head 22 within the bellows. Reference spring 30 is illustratively shown as being of the helical type although any other suitable type of spring may be utilized, for example, a belleville spring. Spring 30 is placed around a shoulder 31 on the end wall 19. As should be obvious, the threshold, or yield, point and spring rate for the spring 30 are selected as needed to produce the required motion of the sensor head in response to a change in input pressure of a predetermined magnitude.

As described so far, the pneumatic control device is fairly conventional and, as should be clear from the description hereafter, almost any siutable type of control device may be used so long as it has a movable element, such as head 22, which is magnetically responsive.

A generally U-shaped permanent magnet 40 having arms 40a and 40b and a cross arm 40c is located within the housing. Of course any other suitable shape magnet may be utilized and the material therefor, such as ALNICO, and the size thereof are selected to produce the desired flux. An electromagnet may be used, if desired, but this would increase the complexity of the structure. The magnet is held to the interior face of the end wall 13 by one or more screws 42 which mate with threaded bores 43 in the cross arm 40c. The screws 42 and the portion of the end wall 16 used as the base for the magnet are preferably made of a suitable non-magnetic material so that the flux of the magnet will not be adversely affected. It should be understood, of course, that in a U-shaped magnet it is difficult to divert flux from the cross arm. Any suitable mounting arrangement may be used as would be conventional in the art.

Connected to each of the arms 40a and 40b of the magnet is a respective pole piece 45a and 45b each of which has a respective stepped portion 46a and 46b located opposite the face of the sensor head 22. As can be seen, the longer arms of the pole pieces 45a and 45b form a shunt path for the magnetic flux of the two arms 40a and 40b with this shunt path having a fixed length air gap 47 between the pole pieces. A second and variable length air gap 48 is formed between the faces of the steps 46a and 46b and the head 22 which serves as the return path for the magnetic circuit. Gap 48 varies in accordance with the pressure at the inlet 16 which acts on the sensor head 22 to move it in a manner predetermined by the selection of spring 30. As is conventional in magnetic techniques, the length of the shunt gap 47 can be varied to control the flux across variable gap 48.

One or more turns of conductive wire 51 are wound around pole piece 45b and spaced therefrom by a suitable insulating member 53. The wire 51, which forms a closed loop shorting coil, is selected of the desired size and number of turns and placed on the pole piece for the purpose described below. A single layer of turns is illustratively shown.

The action of the pneumatic sensor with the magnetic damping means is as follows. The magnetic flux through the variable gap 48 provides an attractive force on the bellows sensing head 22. This force is in opposition to the direction of travel of the head produced by increased input pressure so it is a damping force. As should be clear, the attractive force is greater for smaller lengths of gap 48 due to the reduction in spacing between the steps 46a and 46b of the pole pieces and the face of the sensor head.

As the length of variable gap 48 decreases, the magnetic flux and the attractive magnetic force on the head also increases since more of the flux is diverted from the shunt gap 47 to the head. This represents a negative spring rate since for very small gaps, corresponding to very small deflections of the sensor head 22, a larger attractive magnetic force is provided by the flux diverted from shunt gap 47. This force is in a direction opposite to the small deflections and is in addition to the force provided by the variable gap 48.

A portion of the lines of magnetic flux diverted from the shunt gap 47 to the head 22 cuts the shorting coil 51. When the flux is changing, as would be the case when the head 22 is moving, the flux cutting the coil 51 induces a voltage which is dissipated in the closed conductive path of the coil. The voltage induced in the coil increases both as a function of decreasing distance for gap 48, which makes more flux available from the shunt gap for the coil, and increased speed of the head. The coil is not responsive to the steady state value of the flux. Thus, the shorting coil 51 impedes the transfer of flux from the shunt gap 47 to the sensor head when the head is moving to provide damping proportional to both the speed of the sensor head and its proximity to the magnet.

It therefore can be seen that the steady state flux across the gap 48 and the flux diverted from the gap 47 to the sensor head provides damping which is proportional to the amount of deflection of the sensor head from the magnet since the attractive force diminishes as the gap 48 increases. The shorting coil reduces this damping proportional to the speed of the sensor head. This combination of damping is relatively linear over the travel path of the head thereby increasing the accuracy of the control device.

The described magnetic damping arrangement provides desired damping for stability of the control device and prevents vibration or oscillation of the sensor head to achieve its conventional objectives. Additionally, the magnetic damper also provides what amounts to a negative spring rate for spring 30 since the attractive force between the magnet and the sensor head amounts to a force (pressure) which must be overcome before deflection of the head 22 can start. Thus, the weight and size of spring 30 can be reduced from that normally needed to produce a given reference yield point and spring rate. This attractive force can be adjusted by adjusting the flux density output of the magnet.

By utilizing the arrangement of the present invention substantially linear damping is provided. Also, the damping arrangement has little random force when the speed is zero since the flux paths are controlled by the air gaps and the steady state value of flux. The arrangement has the further advantages in that it adds no mass to the moving sensor head since the damping is provided external to the head. All of these various features produce a control device which is highly accurate and which can be used in applications where variations in pressure must be sensed and used to produce predetermined motion of the sensor head and its connected actuating device.

While a preferred embodiment of the invention has been described above it will be understood that this embodiment is illustrative only and the invention is to be limited solely by the appended claims.

What is claimed is:

1. A pneumatic control device comprising:
    pressure responsive means adapted to be moved in response to changes in pressure of a pneumatic fluid,
    a head on said pressure responsive means, at least a portion of said head being of a magnetically responsive material,
    a magnet for damping the motion of said head located with respect to said head so that at least a portion of the magnetic flux produced by the magnet exerts a force on the head through a variable distance gap between said head and said magnet,
    means on said magnet establishing a shunt gap for flux of the magnet, the flux through said shunt gap tending to be transferred to said variable gap as said head moves closer to said magnet,
    and means for impeding the transfer of flux from said shut gap to said variable gap.

2. A pneumatic control device comprising:
    pressure responsive means adapted to be moved in response to changes in pressure of pneumatic fluid,
    a head on said pressure responsive means, at least a portion of said head being of a magnetically responsive material,
    a magnet for damping the motion of said head located with respect to said head so that at least a portion of the magnetic flux produced by the magnet exerts a force on the head through a variable distance gap between said head and said magnet,
    means on said magnet establishing a shunt gap for flux of the magnet, the flux through said shunt gap tending to be transferred to said variable gap as said head moves closer to said magnet, and a shortening coil on said magnet for impending the transfer of flux from said shunt gap to said variable gap in a manner related to the speed of movement of the head.

3. A pneumatic control device comprising:

pressure responsive means adapted to be moved in response to changes in pressure of a pneumatic fluid, a head on said pressure responsive means, at least a portion of said head being of a magnetically responsive material, a magnet for damping the motion of said head, said magnet oriented with respect to said head so that at least a portion of the magnetic flux produced by the magnet exerts an attractive force on said head, a pair of pole pieces on said magnet establishing a fixed shunt gap for the flux of the magnet and a gap between said head and said magnet pole pieces whose distance varies in accordance with the movement of said head, the flux through said shunt gap tending to be transferred to said variable gap as said head moves closer to said pole pieces, and a shortening coil on one of said pole pieces for impeding the transfer of flux from said shunt gap to said variable gap in a manner related to the speed of movement of the head.

4. A pneumatic control device as set forth in claim 3 wherein said magnet is of the permanent magnet type and is generally U-shaped.

5. A pneumatic control device comprising:

a housing having an inlet for a pneumatic fluid, pressure responsive means within said housing for movement in response to changes in pressure of the pneumatic fluid, a head having at least a portion thereof of a material which is responsive to magnetic flux, means connecting said head to said pressure responsive means, a magnet for damping the motion of said head held in fixed relationship to said housing and located with respect to said head so that at least a portion of the magnetic fluid produced by the magnet exerts a force on said head, means on said magnet establishing a shunt gap for the flux of the magnet and a variable distance gap between said head and said magnet, the flux through said shunt gap tending to be transferred to said variable gap as said head moves closer to said magnet, and means for impending the transfer of flux from said shunt gap to said variable gap.

6. A pneumatic control device comprising:

a housing having an inlet for a pneumatic fluid, pressure responsive means within said housing for movement in response to changes in pressure of the pneumatic fluid, a head having at least a portion thereof of a material which is responsive to magnetic flux, means connecting said head to said pressure responsive means, a magnet for damping the motion of said head held in fixed relationship to said housing and located with respect to said head so that at least a portion of the magnetic flux produced by the magnet exerts a force on said head, means on said magnet establishing a shunt gap for the flux of the magnet and a variable distance gap between said head and said magnet, the flux through said shunt gap tending to be transferhed to said variable gap as said head moves closer to said magnet, and a shorting coil on said magnet for impeding the transfer of flux from said shunt gap to said variable gap in a manner related to the speed of movement of the head.

7. A pneumatic control device comprising:

a housing having an inlet for a pneumatic fluid, pressure responsive means within said housing for movement in response to changes in pressure of the pneumatic fluid, a head having at least a portion thereof of a material which is responsive to magnetic flux, means connecting said head to said pressure responsive means, a magnet for damping the motion of said head held in fixed relationship to said housing and located with respect to said head so that at least a portion of the magnetic flux produced by the magnet exerts a force on said head, a pair of pole pieces on said magnet establishing a fixed shunt gap for the flux of the magnet and a gap between said head and said magnet pole pieces whose distance varies in accordance with the movement of said head, the flux through said shunt gap tending to be transferred to said variable gap as said head moves closer to said pole pieces, and a shorting coil on one of said pole pieces for impeding the transfer of flux from said shunt gap to said variaple gap in a manner related to the speed of movement of the head.

8. A pneumatic control device set forth in claim 7 wherein said magnet is of the permanent magnet type and is generally U-shaped.

References Cited by the Examiner

UNITED STATES PATENTS

| 2,188,803 | 1/1940 | Boehne | 317—171 |
| 2,402,920 | 6/1946 | Seibold | 123—1 X |
| 2,546,740 | 3/1951 | Goldberg | 317—184 |
| 2,627,846 | 2/1953 | Boedeker | 92—15 X |
| 2,991,338 | 7/1961 | Mason | 200—83.6 X |
| 3,146,381 | 8/1964 | Moreau | 317—171 |

FOREIGN PATENTS 895,748   5/1962   Great Britain.

MARTIN P. SCHWADRON, *Primary Examiner.*

EDGAR W. GEOGHEGAN, *Examiner.*

I. C. COHEN, *Assistant Examiner,*